(12) United States Patent
Maruyama

(10) Patent No.: US 6,477,448 B1
(45) Date of Patent: Nov. 5, 2002

(54) FORCE FEED BACK SUPPLY APPARATUS

(75) Inventor: Shigeaki Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/512,368

(22) Filed: Feb. 25, 2000

(30) Foreign Application Priority Data

Feb. 26, 1999 (JP) ............................................ 11-049402

(51) Int. Cl.$^7$ ............................. G05B 11/01; B25J 3/00
(52) U.S. Cl. ......................... 700/302; 700/85; 700/260; 318/568.11; 318/628; 414/5
(58) Field of Search ................ 414/5; 700/56.61–56.66, 700/85, 83, 186, 193, 245, 250, 253, 260, 261, 264, 301, 302; 901/34; 318/628, 568.11

(56) References Cited

U.S. PATENT DOCUMENTS

| | | | |
|---|---|---|---|
| 5,193,963 A | * 3/1993 | McAffee et al. | 414/5 |
| 5,629,594 A | * 5/1997 | Jacobus et al. | 318/568.1 |
| 5,691,898 A | * 11/1997 | Rosenberg et al. | 345/161 |
| 5,754,023 A | * 5/1998 | Roston et al. | 318/561 |
| 5,828,813 A | * 10/1998 | Ohm | 700/260 |
| 5,844,392 A | * 12/1998 | Peurach et al. | 318/561 |
| 6,128,554 A | * 10/2000 | Damotte | 244/223 |

* cited by examiner

*Primary Examiner*—Leo Picard
*Assistant Examiner*—Paul Rodriguez
(74) *Attorney, Agent, or Firm*—Jay H. Maioli

(57) ABSTRACT

A force feed back supply apparatus having a force feed back supply unit which is held by or mounted on an operator, and a force feed back generating unit for providing the force feed back supply unit with the load corresponding to an operation or the like of the operator, includes a clutch mechanism interposed between the force feed back supply unit and the force feed back generating unit; detector for detecting the position and orientation (attitude) of the force feed back supply unit with respect to the force feed back generating unit; and a controller for controlling the force feed back generating unit on the basis of the detection result of the detector, wherein when a force feed back is supplied, the clutch mechanism is set to be coupled between the force feed back supply unit and the force feed back generating unit, and when no force feed back is supplied, the clutch mechanism is set to be uncoupled between the force feed back supply unit and the force feed back generating unit and the controller controls the force feed back generating unit on the basis of the detection result of the detector so that the relative position between the force feed back supply unit and the force feed back generating unit is kept fixed at all times.

2 Claims, 5 Drawing Sheets

FORCE FEED BACK SUPPLY APPARATUS

BACKGROUND OF THE INVENTION

1. Field of the Invention

The present invention relates to a novel force feed back supply apparatus, and particularly to a technique for preventing an undesirable load from being imposed on an operator when a force feed back is not supplied.

2. Description of the Related Art

There is known a force feed back supply apparatus for enabling an operator to have the touch as if the operator touches a real object or feel the resistance as if the operator operates a real object when the operator touches or operates a virtual object in a virtual space.

According to a conventional force feed back supply apparatus, a portion which is held by or mounted on an operator is linked to a force feed back generating unit for generating a force feed back such as a robot at all times. Therefore, even if no force feed back is supplied, the operator feels the mass (inertial force) of the force feed back generating unit or the frictional resistance of the force feed back generating unit when the operator is about to move his/her arms or the like, and this makes the operator uncomfortable.

In order to avoid this problem, there may be considered a method for miniaturizing the force feed back generating unit at maximum or reducing the frictional resistance of the movable portion. However, this method inherently causes the performance of the force feed back supply apparatus to be dependent on the ratio (output/size) of an actuator. Particularly for an arm type force feed back supply apparatus which is required to supply large force, there does not exist any actuator which can provide a sufficient ratio (output/size).

There is also known a method in which a force sensor is provided between an operator holding portion and a robot portion and the robot is actively controlled on the basis of the signal from the force sensor, thereby reducing the uncomfortableness of the operator. However, it is impossible to perfectly extinguish the uncomfortableness of the operator in this method because delay necessarily occurs in the control loop.

Furthermore, Japanese Patent Laid-open No. 257947/1996 and Japanese Patent Laid-open No. 109070/1997 disclose other methods which do not make any operator feel uncomfortable because the operator is not restrained. According to these methods, an object model used to give a force feed back to an operator is prepared in advance as means for supplying the force feed back and the operator touches his/her finger to the object model. Therefore, when repulsive force from objects having different shapes in the virtual space is supplied, actually existing object models for these objects must be prepared, resulting in complication of the apparatus itself.

SUMMARY OF THE INVENTION

Therefore, an object of the present invention is to provide a force feed back supply apparatus which can prevent an operator from suffering an undesirable load when any force feed back is not supplied.

In order to attain the above object, according to the present invention, a force feed back supply apparatus having a force feed back supply unit which is held by or mounted on an operator, and a force feed back generating unit for providing the force feed back supply unit with the load corresponding to an operation or the like of the operator, is characterized by comprising: a clutch mechanism interposed between the force feed back supply unit and the force feed back generating unit; detection means for detecting the position and orientation (attitude) of the force feed back supply unit with respect to the force feed back generating unit; and a controller for controlling the force feed back generating unit on the basis of the detection result of the detection means, etc., wherein when a force feed back is supplied, the clutch mechanism is set to be coupled between the force feed back supply unit and the force feed back generating unit, and when no force feed back is supplied, the clutch mechanism is set to be uncoupled between the force feed back supply unit and the force feed back generating unit and the controller controls the force feed back generating unit on the basis of the detection result of the detection means so that the relative position between the force feed back supply unit and the force feed back generating unit is kept fixed at all times.

Accordingly, according to the force feed back supply apparatus of the present invention, since the force feed back supply unit and the force feed back generating unit are mechanically separated from each other when no force feed back is supplied, the operator can be prevented from suffering a vain load due to the inertial force, frictional resistance or the like of the force feed back generating unit.

DETAILED DESCRIPTION OF THE PREFERRED EMBODIMENT

A preferred embodiment of a force feed back supply apparatus according to the present invention will be described with reference to the accompanying drawings hereunder. In the following embodiment, the present invention is applied to an apparatus in which an operator grasps a grip serving as a force feed back supply unit and the operator is supplied with a force feed back through the grip.

Figure 1:
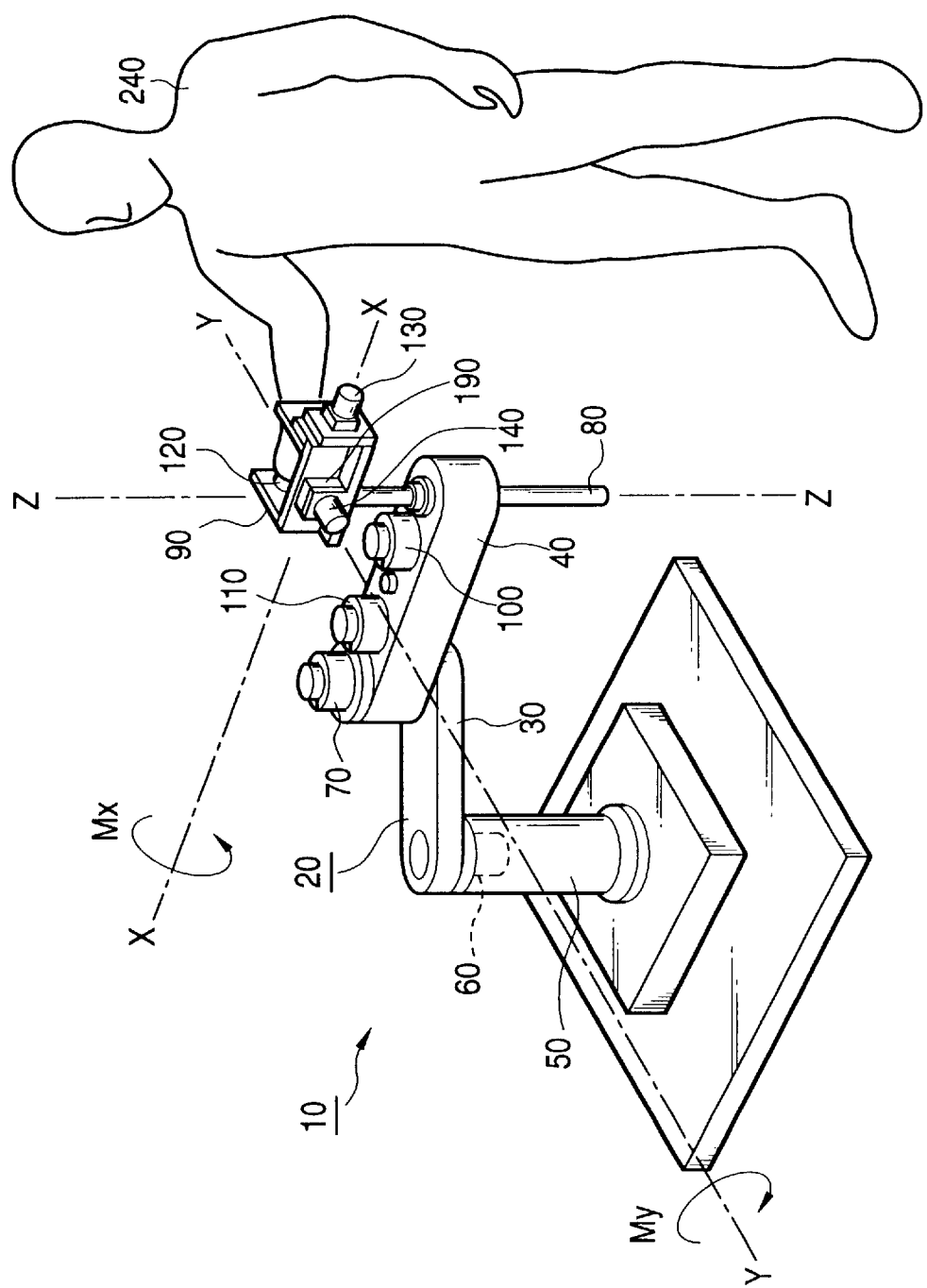
FIG. 1 is a perspective view showing an embodiment of a force feed back supply apparatus according to the present invention.

FIG. 1 schematically shows the overall image of a force feed back supply apparatus 10.

The force feed back supply apparatus 10 of this embodiment is provided with a multi-arm type robot 20 as the force feed back generating unit. The robot 20 includes a first arm 30 and a second arm 40. The first arm 30 has a base end portion which is freely rotatably supported on the upper end of a base stand potion 50, and is rotated in the horizontal direction by a motor 60. The second arm 40 is freely rotatably supported at the rotational end portion of the first arm 30, and is rotated in the horizontal direction to the first arm 30 by a motor 70.

A grip support portion 90 is mounted through a ball spline 80 at the rotational end portion of the second arm 40 so as to be freely movable in the up-and-down direction. The ball spline 80 is moved in the up-and-down direction by a motor 100, and also rotated relatively to the second arm 40 by a motor 110.

The grip support portion 90 is mounted so as to be rotatable around the X axis and the Y axis (see FIG. 1) with respect to the ball spline 80. That is, it is rotated around the X axis by a motor 130 and around the Y axis by a motor 140.

Figure 2:
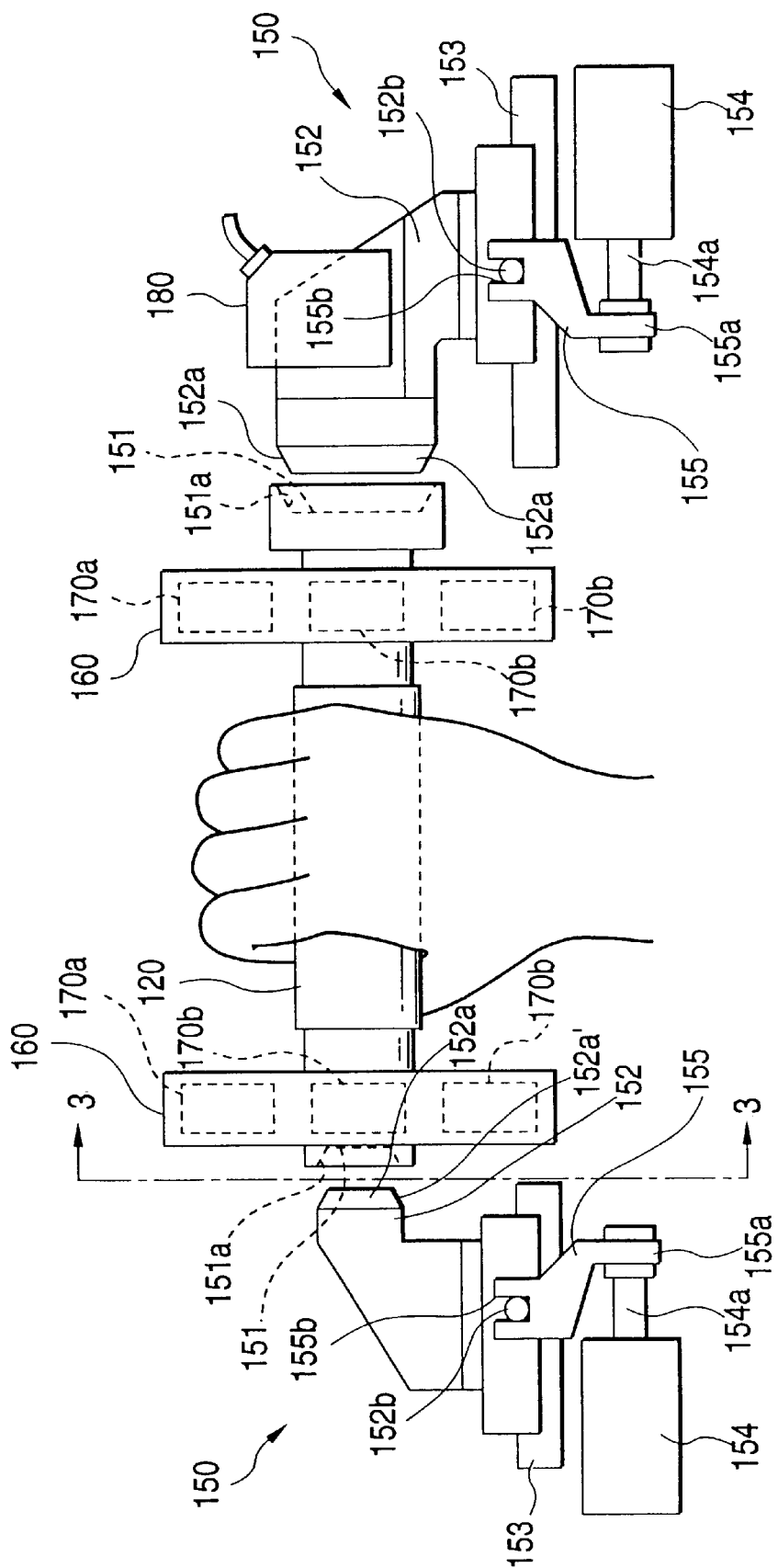
FIG. 2 is a side view showing the details of the coupling portion between a force feed back supply unit and a force feed back generating unit.

FIG. 2 shows the construction of the surrounding portion of a grip 120.

Recess portions 151 are formed on both the end surfaces of the grip 120 as a clutch element serving as a part of a clutch 150 for linking/separating the grip 120 to/from the robot 20. Further, rectangular frames 160 are provided to the grip support portion 90 so as to surround both the end portions of the grip 120, and both the end portions of the grip 120 are set to be freely movable within the frames 160 under such a state that the grip 120 is not linked to the robot 20 by the clutch 150.

Figure 3:
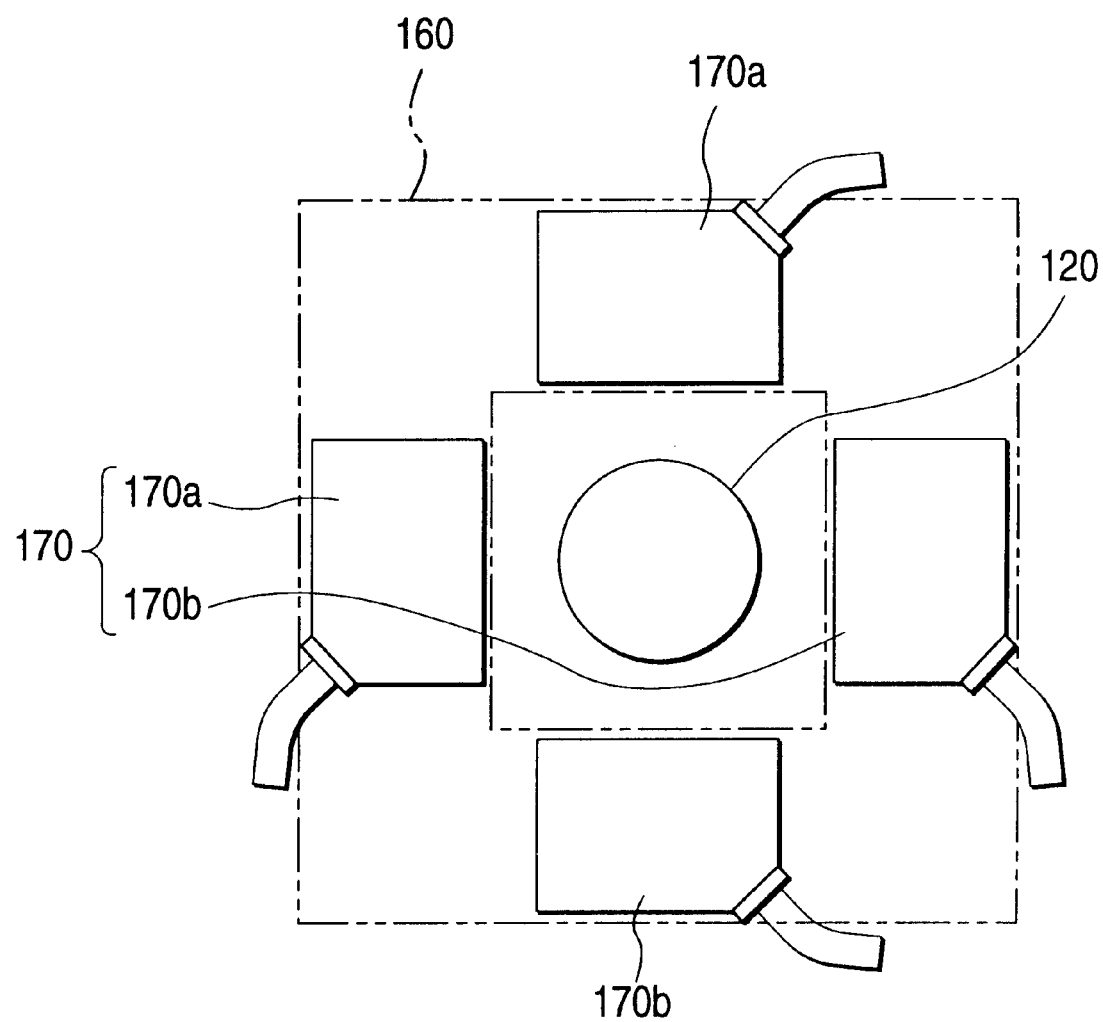
FIG. 3 is a view taken along a line 3—3 of FIG. 2.

Radial-direction displacement detection sensors 170 are disposed on the frames 160 so as to surround the end portions of the grip 120 from four directions. Each radial-direction displacement detection sensor 170 is designed as an optical type, and comprises a pair of a light emitting portion 170*a* and a photodetecting portion 170*b*. As shown in FIG. 3, two pairs of radial-direction detection sensors 170 are disposed on each frame 160 so that the optical axes thereof are perpendicular to each other, whereby the displacement and inclination in the radial direction of the grip 120 with respect to the grip support portion 90 of the tip portion of the robot 20 are detected in a non-contact style. Further, an axial-direction detection sensor 180 is provided so as to confront one end face of the grip 120 of the grip support portion 90. The axial-direction detection sensor 180 is designed as an optical type, and detects the displacement in the axial direction of the grip 120 in a non-contact style.

Coupling pins 152 constituting the clutches 150 are mounted on longitudinal motion guides 153 supported on the grip support portion 90 so that they are freely movable so as to approach to and separate from the end faces 151 of the grip 120. The portions 152*a* of the coupling pins 152 which confront the end faces of the grip 120 are designed as projections (serving as clutch elements) which can be engagedly inserted in the recess portions 151 formed on the end faces of the grip 120. The coupling pins 152 are moved by air cylinders 154. A link rod 155 is provided between each coupling pin 152 and each air cylinder 154, and one end portion 155*a* thereof is linked to the tip portion of the piston 154*a* of the air cylinder 154. A notch 155*b* which is formed on the other end portion of each link rod 155 is hooked by a link pin 152*b* projecting from each coupling pin 152. Accordingly, the coupling pins 152 are coupled to or separated from the end portions of the grip 120 by driving the air cylinders 154.

That is, when the coupling pins 152 are moved so as to approach to the grip and the projections 152*a* thereof are fitted into the recess portions of the grip 120, the clutches 150 are set to a coupling state (ON state), whereby the grip 120 serving as the force feed back supply unit and the robot 20 serving as the force feed back generating unit are coupled to each other. On the other hand, when the coupling pins 152 are moved so as to be far away from the grip 120, the engagement between the projections 152*a* and the recess portions of the grip 120 is released to set the clutches 150 to an open state (OFF state), whereby the grip 120 and the robot 20 are separated from each other.

Under the state that the grip 120 is coupled to the clutches 150, the grip 120 is set to be unrotatable and unmovable relatively to the clutches 150.

Further, a six-axial force sensor 190 is provide to the grip support portion 90 (see FIG. 1). When the operator operates, the six-axial force sensor 190 detects the force in each of the X, Y and Z axes (see FIG. 1) and the force around each axis.

Figure 4:
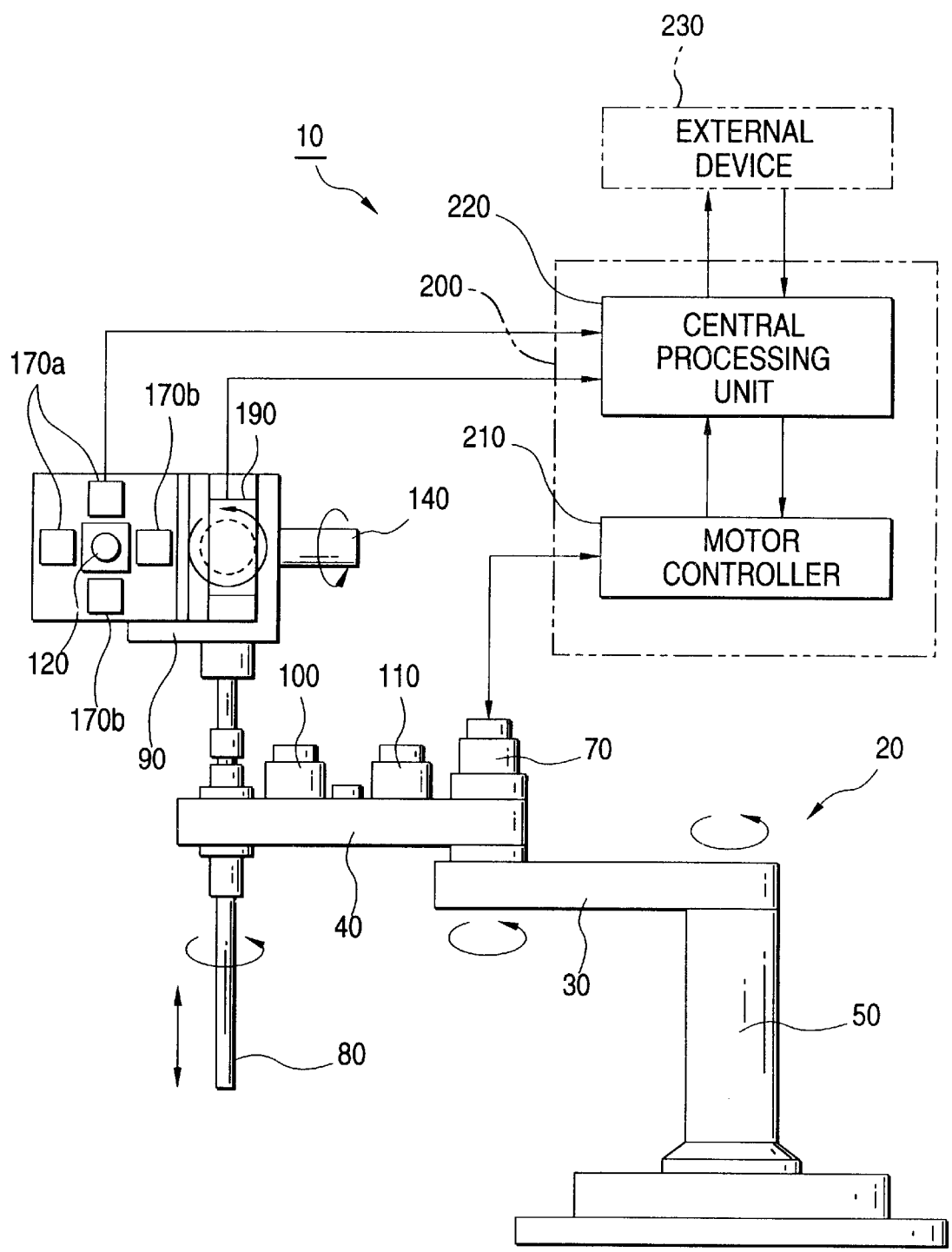
FIG. 4 is a control block diagram.

FIG. 4 is a control block diagram.

A controller 200 includes a motor controller 210 for controlling the motors 60, 70, 100, 110, 130 and 140 of the robot 20, and a central processing unit 220 for determining the position of a hand of an operator 240 on the basis of the signals from the radial-direction displacement detection sensors 170, the axial-direction detection sensor 180 and the six-axial force sensor 190 and the signal associated with the phase of the respective motors which is supplied from the motor controller 210, and calculating proper instruction values for the motors 60, 70, 100, 110, 130 and 140. The central processing unit 220 is provided with an external device 230 such as a device for visually or acoustically displaying an object in the virtual space and a terminal for inputting/outputting signals.

Next, the operation of the force feed back supply apparatus 10 will be described hereunder.

In the following description, it is assumed that the operator 240 grasps the grip 120 at all times.

First, there will be described such a case where no force feed back is supplied. Here, the case where no force feed back is supplied means such a situation that when the force feed back supply apparatus 10 is applied to virtual reality, the operator 240 extends his/her hand to a virtual object in a virtual space formed by CG (Computer Graphics) or other methods to touch the object (the hand has not yet reached the object), or such a situation that the operator 240 moves his/her hand irrespective of the virtual object.

In these situations, the clutch 150 is released, that is, the engagement between the projections 152*a* of the coupling pins 152 and the recess portions 151 of the grip 120 is kept released, and thus the mechanical coupling between the grip 120 and the robot 20 is released.

The operator 240 can move his/her arm in any direction and at any speed while holding the grip 120. The variation of the position and orientation (attitude) of the arm of the operator 240 with time (hereinafter referred to as "positional and orientational time-variation") can be detected and signalized as the relative positional and orientational variation between the grip 120 and the robot 20 by the radial-direction displacement detection sensors 170 and the axial-direction detection sensor 180, and then transmitted to the central processing unit 220.

In the central processing unit 220, the signal on the phase of the motors 60, 70, 100, 110, 130 and 140 which is supplied from the motor controller 210 and the signals from the sensors 170 and 180 are combined with one another to calculate the position and orientation of the arm of the operator 240 relative to the robot 20. Further, the instruction values for the motors 60, 70, 100, 110, 130 and 140 are calculated so that each of the output signals of the sensors 170 and 180 is converged within a proper range and output to the motor controller 210, thereby performing the control of keeping the substantially fixed positional relationship between the grip 120 and the grip support potion 90 of the robot 20 at all times. In other words, since the grip support potion 90 of the robot 20 follows any motion of the grip 120 while keeping a fixed spatial distance from the grip 120, the operator 240 does not feel any force (inertial force) and any frictional force which occur due to the mass of the robot 20.

As described above, the central processing unit 220 grasps the absolute position of the grip 120 in the three-dimensional space by the detection means, that is, the radial-direction displacement detection sensors 170 and the axial-direction detection sensor 180 at all times, so that it is unnecessary to separately provide sensors for detecting the absolute position of the grip 120.

Next, a case where a force feed back is supplied will be described.

When the force feed back is supplied, the clutch 150 is set to the coupled state, that is, the projections 152a of the coupling pins 152 are kept to be fitted in the recess portions 151 of the grip 120.

When-the operator 240 acts on a virtual object in the virtual space by using a part of his/her hand itself or an instrument such as a stick, the central processing unit 220 calculates a repulsive force vector and instruction values for the motors 60, 70, 100, 110, 130 and 140 associated with the repulsive force vector on the basis of the physical properties such as the surface friction coefficient, elasticity and mass, of the virtual object which are defined in advance. The motors 60, 70, 100, 110, 130 and 140 are controlled through the motor controller 210 and the force feed back is supplied to the operator 240 through the grip 120. In this case, the virtual object in the virtual space may be a single, for example, in such a case that the operator directly touches something by his/her hand in the virtual space, or may be a mutual action between plural objects, for example, in such a case that a stick grasped by the hand of the operator touches an object existing in the virtual space.

One or both of the encoder signal from the motors 60, 70, 100, 110, 130 and 140 and the signal from the six-axial force sensor 190 are used as a feedback signal used when the force feed back is supplied. In this case, it is judged in the central processing unit 220 which signal should be used, and a proper signal is selected so that the processing result that is more suitable to- supply the more proper force feed back to the operator 240 can be calculated.

The clutch 150 is switched on/off in accordance with the supply or non-supply of the force feed back.

When the clutch 150 is switched from the OFF state to the ON state, the position and orientation of the grip support portion 90 of the robot 20 with respect to the grip 120, more specifically, the position and orientation of the projections 152a of the coupling pins 152 with respect to the recess portions 151 of the grip 120 are adjusted to be proper by the radial-direction displacement detection sensors 170 and the axial-direction detection sensor 180. As described above, when the clutch 150 is set to the OFF state, the grip support portion 90 of the robot 20 is controlled to be kept in a fixed positional relationship with the grip 120 at all times. Therefore, if the "fixed positional relationship" described above is proper to set the clutch 150 to the ON state, the above adjustment operation is unnecessary. Further, taper portions 151a and 152a' are provided to the contact surfaces of the recess portions 151 of the grip 120 and the projections 152a of the coupling pins 152 respectively in order to make the coupling operation easy, whereby the above "proper" range is broadened.

When the clutch 150 is switched from the ON state to the OFF state, no special restriction is imposed.

In the force feed back supply apparatus 10 described above, the operator 240 and the force feed back generating unit (robot) 20 are kept to be mechanically uncoupled to each other when no force feed back is supplied. Therefore, the operator 240 does not feel any uncomfortableness due to the forces which should not originally supplied, such as the inertial force and the frictional resistance, caused by the mass of the force feed back generating unit 20, and thus the operator can freely move his/her body in the space. This also discards such a restriction in design as to miniaturize the apparatus so that the operator is not uncomfortable. Accordingly, the degree of freedom in design of the force feed back supply apparatus can be broadened, and for example, this effect enables the manufacturing of an apparatus for supplying a sufficient force feed back by using a currently-available actuator.

When the force feed back is supplied, the supply of the repulsive force from an object in the virtual space is carried out, not by using an actually-existing object model which is prepared in advance, but by directly acting the force on the body of the operator, so that the supply of the repulsive force of an object having any shape can be performed.

Figure 5:
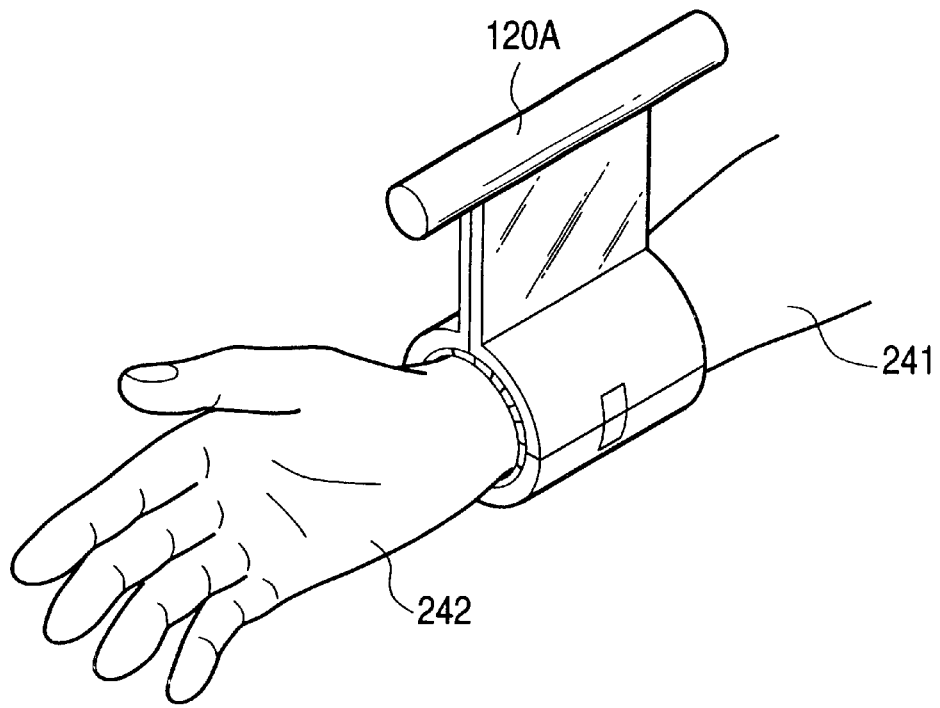
FIG. 5 is a perspective view showing a modification of the force feed back supply unit.
Figure 6:
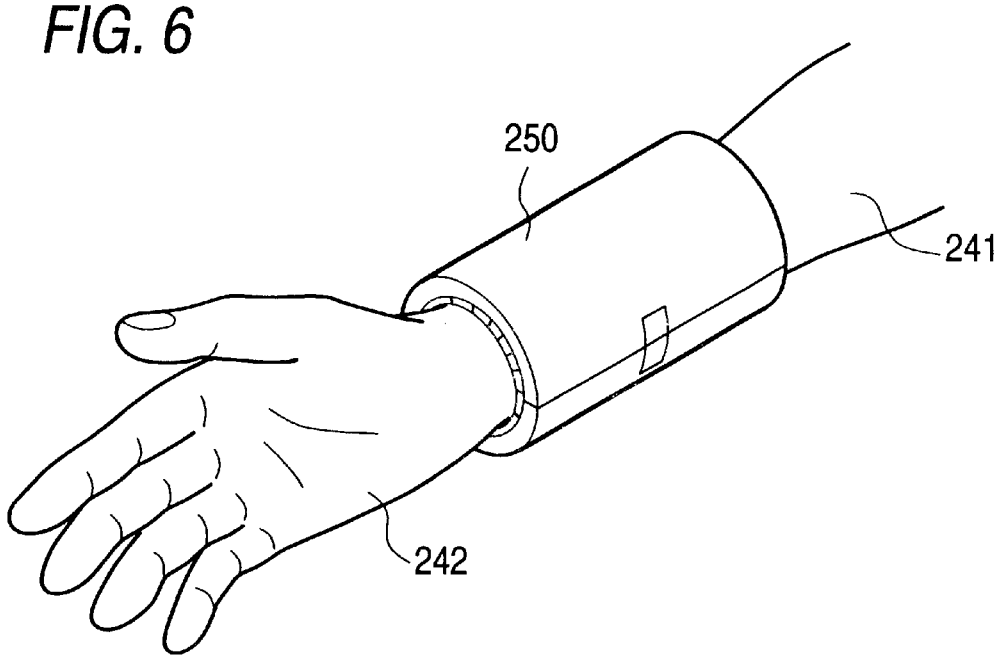
FIG. 6 is a perspective view showing another modification of the force feed back supply unit.

The force feed back supply apparatus 10 shown in the above embodiment is designed as a grip-grasping type. However, it may be of such a type that a grip 120A is fixed to the tip portion of an arm 241 as shown in FIG. 5, or of such a type that a cylindrical holder 250 is mounted at the tip portion of the arm 241 and the holder 250 itself is provided with the same function as the grip 120 as shown in FIG. 6. If the grip 120A shown in FIG. 5 or the holder 250 shown in FIG. 6 is used, an operator's hand 242 is kept free and thus these elements may be used in combination with the grip 120.

In the above embodiment, the optical type sensor is used to detect the relative position and orientation between the grip and the grip support portion of the robot. However, the sensor is not necessarily an optical type, and it may be an electrostatic capacitance and non-contact type sensor or a contact type sensor such as a differential transducer with which only a small force is needed for operation and thus the operator does not feel uncomfortableness.

Further, in the above embodiment, the clutch 150 is implemented by using the air cylinder 154, the longitudinal motion guide 153, the coupling pin 152, the link rod 155 and the recess portion 151 of the grip 120, however, the constituent elements are not limited to these elements insofar as they can implement the clutch function. For example, the clutch function may be implemented by using a solenoid, a motor or electroviscous fluid whose viscosity coefficient is varied by applying a voltage.

In the above embodiment, the force feed back is supplied to the arm of the operator, however, it may be supplied to other body portions such as fingers, or a leg with the same construction. Further, the force feed back may be supplied to a combination of the above elements such as a limb including an arm and fingers.

In the above embodiment, the operator moves his/her arm or touches an object in the three-dimensional space. The dimension may be limited to a specific one, for example, two dimension. In this case, the operator operates on the plane.

The shape and construction of each element of the above embodiment are merely an example when the present invention is implemented, and the scope of the present invention is not interpreted as being limited by these elements.

As described above, according to the present invention, a force feed back supply apparatus having a force feed back supply unit which is held by or mounted on an operator, and a force feed back generating unit for providing the force feed back supply unit with the load corresponding to an operation or the like of the operator, is characterized by comprising: a clutch mechanism interposed between the force feed back supply unit and the force feed back generating unit; detection means for detecting the position and orientation (attitude) of the force feed back supply unit with respect to the force feed back generating unit; and a controller for controlling the force feed back generating unit on the basis of the detection result of the detection means, etc., wherein when a force feed back is supplied, the clutch mechanism is set to be coupled between the force feed back supply unit and the force feed back generating unit, and when no force feed back is supplied, the clutch mechanism is set to be uncoupled between the force feed back supply unit and the force feed back generating unit and the controller controls the force feed back generating unit on the basis of the detection result of the detection means so that the relative position between the force feed back supply unit and the force feed back generating unit is kept fixed at all times.

Accordingly, according to the force feed back supply apparatus of the present invention, since the force feed back supply unit and the force feed back generating unit are mechanically separated from each other when no force feed back is supplied, the operator can be prevented from suffering an undesirable load due to the inertial force, frictional resistance or the like of the force feed back generating unit. Therefore, the operator does not feel uncomfortable when no force feed back is supplied. Accordingly, there is discarded such a restriction in design as to miniaturize the apparatus so that the operator is not uncomfortable. Accordingly, the degree of freedom in design of the force feed back supply apparatus can be broadened, and for example, this effect enables the manufacturing of an apparatus for supplying a sufficient force feed back by using a currently-available actuator.

Further, even when the clutch is set to the uncoupling state and the force feed back supply unit and the force feed back generating unit are mechanically separated from each other under the non-supply state of the force feed back, the relative positional relationship between the force feed back supply unit and the force feed back generating unit can be set to be substantially fixed, so that the current state can be easily changed from the force feed back non-supply state to the force feed back supply state.

Still further, since the relative position and orientation between the force feed back supply unit and the force feed back generating unit can be detected by the detection means, the absolute position and orientation of the force feed back supply unit can be calculated by adding the information on the position and orientation of the force feed back generating unit.

According to the invention, the clutch element at the force feed back supply unit side and the clutch element at the force feed back generating unit side are coupled to each other through the recess/projection engagement, and the taper portions are provided to the engagement portions between the two clutch elements. Therefore, even when the relative positional relationship between the force feed back supply unit and the force feed back generating unit are slightly improper (which may be caused by the delay in following of the force feed back generating unit to the force feed back supply unit), the two clutch elements can be surely coupled to each other.

Further, when the two clutch elements are coupled to each other, the positional relation between the two clutch elements can be kept to be fixed at all times.

What is claimed is:

1. A force feed back supply apparatus having a force feed back supply unit held by or mounted on an operator, and a force feed back generating unit for providing the force feed back supply unit with a load corresponding to an operation of the operator, by comprising:

a clutch mechanism interposed between said force feed back supply unit and said force feed back generating unit;

detection means for detecting a position and an orientation of said force feed back supply unit with respect to said force feed back generating unit; and a controller for controlling said force feed back generating unit based on a detection result of said detection means, wherein when a force feed back is supplied said clutch mechanism is set to be coupled between said force feed back supply unit and said force feed back generating unit, and when no force feed back is supplied the clutch mechanism is set to be uncoupled between the force feed back supply unit and the force feed back generating unit and the controller controls the force feed back generating unit based on the detection result of the detection means, so that a relative position between the force feed back supply unit and the force feed back generating unit is kept fixed.

2. The force feed back supply apparatus a s claimed in claim 1, wherein said clutch mechanism comprises a first clutch element at the force feed back supply unit and a second clutch element at the force feed back generating unit being coupled to each other through a recess/projection engagement, and taper portions are provided to engagement portions between said first and second clutch elements.

* * * * *